United States Patent
Tzur et al.

(10) Patent No.: US 11,080,938 B1
(45) Date of Patent: Aug. 3, 2021

(54) AUTOMATIC SUMMARIZATION OF REMOTELY-GUIDED AUGMENTED REALITY SESSIONS

(71) Applicant: International Business Machines Corporation, Armonk, NY (US)

(72) Inventors: Yochay Tzur, Haifa (IL); Eyal Mush, Gaaton (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/833,945

(22) Filed: Mar. 30, 2020

(51) Int. Cl.
    *G06T 19/00* (2011.01)
    *H04L 12/58* (2006.01)
    *G06K 9/00* (2006.01)

(52) U.S. Cl.
    CPC ........ *G06T 19/006* (2013.01); *G06K 9/00671* (2013.01); *H04L 51/16* (2013.01); *G06T 2219/004* (2013.01); *G06T 2219/024* (2013.01)

(58) Field of Classification Search
None
See application file for complete search history.

(56) References Cited

U.S. PATENT DOCUMENTS

| | | | |
|---|---|---|---|
| 6,941,248 | B2 | 9/2005 | Friedrich |
| 7,110,909 | B2 | 9/2006 | Friedrich |
| 10,187,686 | B2 | 1/2019 | Mullins |
| 2018/0276895 | A1 | 9/2018 | Hodge |

FOREIGN PATENT DOCUMENTS

EP      3281403 A1    2/2018

OTHER PUBLICATIONS

Wang et al., "An Augmented Reality Based System for Remote Collaborative Maintenance Instruction of Complex Products", IEEE, 2014. (Year: 2014).*
U.S. Appl. No. 16/681,888, Oded Dubovsky.

* cited by examiner

Primary Examiner — Nicholas R Wilson
(74) Attorney, Agent, or Firm — Dvir Gassner

(57) ABSTRACT

Receiving a recording of a remotely-guided augmented reality (AR) session which includes: images of a scene, captured by a camera of a local user; position and orientation data of the camera; and annotations generated by a remote user at points-of-interest (POIs) in a three-dimensional (3D) representation of the scene. Automatically generating a summary of the session, by: projecting the annotations to matching locations in some of the prominent images, based on the POIs of the annotations and on the position and orientation data of the camera and including, in the summary: the prominent images, including those of the prominent images having the projected annotations.

15 Claims, 4 Drawing Sheets

AUTOMATIC SUMMARIZATION OF REMOTELY-GUIDED AUGMENTED REALITY SESSIONS

BACKGROUND

In one type of augmented reality (AR) application, a user's physical surroundings are, in real time, recorded by a video camera and presented to the user on a video display together with digital content, such as computer-generated text or images, that are not found in the user's physical surroundings. Such AR applications are often used to provide training and assistance to users who work with equipment by identifying points of interest (POIs) on such equipment, visually indicating an identified POI to the user together with a text annotation describing the POI, and often also displaying other step-by-step text instructions as well.

One prominent implementation of this type of AR application is remotely-guided AR sessions. In such sessions, while a local user views a video of his or her physical surroundings on a video display, the video is simultaneously transmitted to a remote user who, using computer software, indicates POIs on objects appearing in the video and provides associated textual/graphical annotations and step-by-step text instructions that are immediately transmitted back to the local user and presented on the local user's video display. It is also common to transmit instructions via voice, and even to conduct a live voice conversation between the local and remote users.

With an aging workforce and ever-high employee turnover rates, it has become increasingly important for organizations to preserve the technical knowledge accumulated by their employees. Many organizations set knowledge retention policies that include, for example, meticulous documentation of technical procedures, maintenance of collaborative knowledge bases, and more. However, with respect to remotely-guided AR sessions conducted within the organization, retention of the knowledge expressed during the sessions is not a trivial task. Merely recording the raw session (its video stream, annotations, conversation, etc.) would yield a massive collection of data per each session, which is neither easily nor quickly comprehensible by other employees who wish to learn from the session later on. Just as an example, an hour-long session recorded at a rate of 30 frames per second may yield 108,000 video frames, dozens of textual/graphical annotations made by the remote user, and hundreds of lines of textual conversation (or of a transcript of a voice conversation) between the local and remote users.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment is directed to a method which includes operating at least one hardware processor to: Receive a recording of a remotely-guided augmented reality (AR) session, the recording comprising: images of a scene, captured by a camera of a local user; position and orientation data of the camera; annotations generated by a remote user at points-of-interest (POIs) in a three-dimensional (3D) representation of the scene. Automatically generate an electronic document which comprises a summary of the remotely-guided AR session, by: (i) Selecting prominent images out of the images of the scene, by: (a) defining the images of the scene as a set of candidate images (G), (b) adding, to an empty set (S), those of the images of G on which the annotations were indicated during the remotely-guided AR session, (c) removing from G images whose pairwise viewed region distance from any image in S is below a predefined threshold, and (d) adding to S additional images from G using a non-maximal suppression algorithm in which images of G are sorted according to a focus score and are rejected according to viewed region distance, such that S includes the prominent images. (ii) Projecting the annotations to matching locations in some of the prominent images, based on the POIs of the annotations and on the position and orientation data of the camera. (iii) Including, in the summary: the prominent images, including those of the prominent images having the projected annotations.

Another embodiment is directed to a system which includes at least one hardware processor, and a non-transitory computer-readable storage medium having program code embodied therewith, the program code executable by said at least one hardware processor to: Receive a recording of a remotely-guided augmented reality (AR) session, the recording comprising: images of a scene, captured by a camera of a local user; position and orientation data of the camera; annotations generated by a remote user at points-of-interest (POIs) in a three-dimensional (3D) representation of the scene. Automatically generate an electronic document which comprises a summary of the remotely-guided AR session, by: (i) Selecting prominent images out of the images of the scene, by: (a) defining the images of the scene as a set of candidate images (G), (b) adding, to an empty set (S), those of the images of G on which the annotations were indicated during the remotely-guided AR session, (c) removing from G images whose pairwise viewed region distance from any image in S is below a predefined threshold, and (d) adding to S additional images from G using a non-maximal suppression algorithm in which images of G are sorted according to a focus score and are rejected according to viewed region distance, such that S includes the prominent images. (ii) Projecting the annotations to matching locations in some of the prominent images, based on the POIs of the annotations and on the position and orientation data of the camera. (iii) Including, in the summary: the prominent images, including those of the prominent images having the projected annotations.

A further embodiment is directed to a computer program product comprising a non-transitory computer-readable storage medium having program code embodied therewith, the program code executable by at least one hardware processor to: Receive a recording of a remotely-guided augmented reality (AR) session, the recording comprising: images of a scene, captured by a camera of a local user; position and orientation data of the camera; annotations generated by a remote user at points-of-interest (POIs) in a three-dimensional (3D) representation of the scene. Automatically generate an electronic document which comprises a summary of the remotely-guided AR session, by: (i) Selecting prominent images out of the images of the scene, by: (a) defining the images of the scene as a set of candidate images (G), (b) adding, to an empty set (S), those of the images of G on which the annotations were indicated during the remotely-guided AR session, (c) removing from G images whose pairwise viewed region distance from any image in S is below a predefined threshold, and (d) adding to S additional images from G, using a non-maximal suppression algorithm in which images of G are sorted according to a focus score and are rejected according to viewed region distance, such that S includes the prominent images. (ii) Projecting the annotations to matching locations in some of the prominent images, based on the POIs of the annotations and on the position and orientation data of the camera. (iii) Including, in the summary: the prominent images, including those of the prominent images having the projected annotations.

In some embodiments, the pairwise viewed region distance is determined, for any pair of images $I_i$ and $I_j$, by: defining the 3D representation of the scene as a sparse point cloud $\{P_k | k \in [1, 2, \ldots n]\}$ having n points; defining $\pi_{i,k}$ as a projection of $P_k$ to $I_i$, based on the position and orientation data of the camera associated with $I_i$; and defining the pairwise viewed region distance between $I_i$ and $I_j$ as $$D_{i,j} = \sum_k \|\pi_{i,k} - \pi_{j,k}\|_2^2.$$

In some embodiments, the non-maximal suppression algorithm comprises: defining the focus score (F) of each image in G as an aggregate of overall point focus scores of all points $P_k$ whose projections are within the respective image:

$$F_i = \sum_k F_{i,k},$$

wherein each of the point focus scores is determined by: for each point $P_k$, and for each image $I_i$ in G: (a) if $\pi_{i,k}$ is outside boundaries of $I_i$, the point focus score for point $P_k$ is set to zero, (b) if $\pi_{i,k}$ is inside boundaries of $I_i$: (i) defining $d_{i,k} = \|\pi_{i,k} - C_i\|_2^2$ as a distance of point $P_k$ from a center ($C_i$) of $I_i$, (ii) defining $$F_{i,k} = \frac{1}{a + d_{i,k}^2}$$

as a point focus score of point $P_k$ in $I_i$, and (iii) defining $$F_k = \sum_i F_{i,k}$$

as the overall point focus score of point $P_k$ across all of G.

In some embodiments, the non-maximal suppression algorithm further comprises: sorting the images in G in descending order according to their focus scores; and iteratively, until G is empty: (a) adding the first image in G to S, and (b) removing from G any other image of G whose viewed region distance from the first image is below a predefined threshold, such that, when G is empty, S includes the prominent images.

In some embodiments: the recording of the remotely-guided AR session further comprises conversation text between the local user and the remote user; the automatic generation of the electronic document further comprises temporally aligning the conversation text with the projected annotations; and the inclusion in the summary is also of a dissemination of the conversation text amongst those of the prominent images having the projected annotations, wherein the dissemination is according to the temporal alignment.

In addition to the exemplary aspects and embodiments described above, further aspects and embodiments will become apparent by reference to the figures and by study of the following detailed description.

BRIEF DESCRIPTION OF THE DRAWINGS

Aspects of the invention will be understood and appreciated more fully from the following detailed description taken in conjunction with the appended drawings, in which.

DETAILED DESCRIPTION

Disclosed herein is a technique for automatic summarization of a remotely-guided AR session between at least one local user and at least one remote user, which technique may be embodied as a method, system, and computer program product.

This technique may involve automatic processing of a large amount of raw data included in a recording of the remotely-guided AR session, and the automatic generation of a summary which includes at least prominent images from a large set of images captured during the AR session, along with annotations (made by the at least one remote user) projected to at least some of these prominent images. Optionally, also included in the summary is text of a conversation which took place during the remotely-guided AR session between the local and remote users, wherein this text is disseminated amongst the prominent images according to a temporal alignment between segments of the texts and the prominent images.

The generated summary may then be readily utilized by any person wishing to learn how to conduct the same procedure as in the remotely-guided AR session. These persons will not have to watch lengthy videos or observe large quantities of images, nor will they have to bother with understanding where each recorded annotation belongs or what image is referred to by each segment of the conversation text. Rather, the automatic summarization technique disclosed herein intelligently processes these large amounts of data into a clear, concise, and distraction-free summary, provided as an electronic document. An additional advantage of the present technique is that it greatly preserves computer storage space, because the generated summaries are orders of magnitude smaller than the entire AR sessions data.

Figure 1:
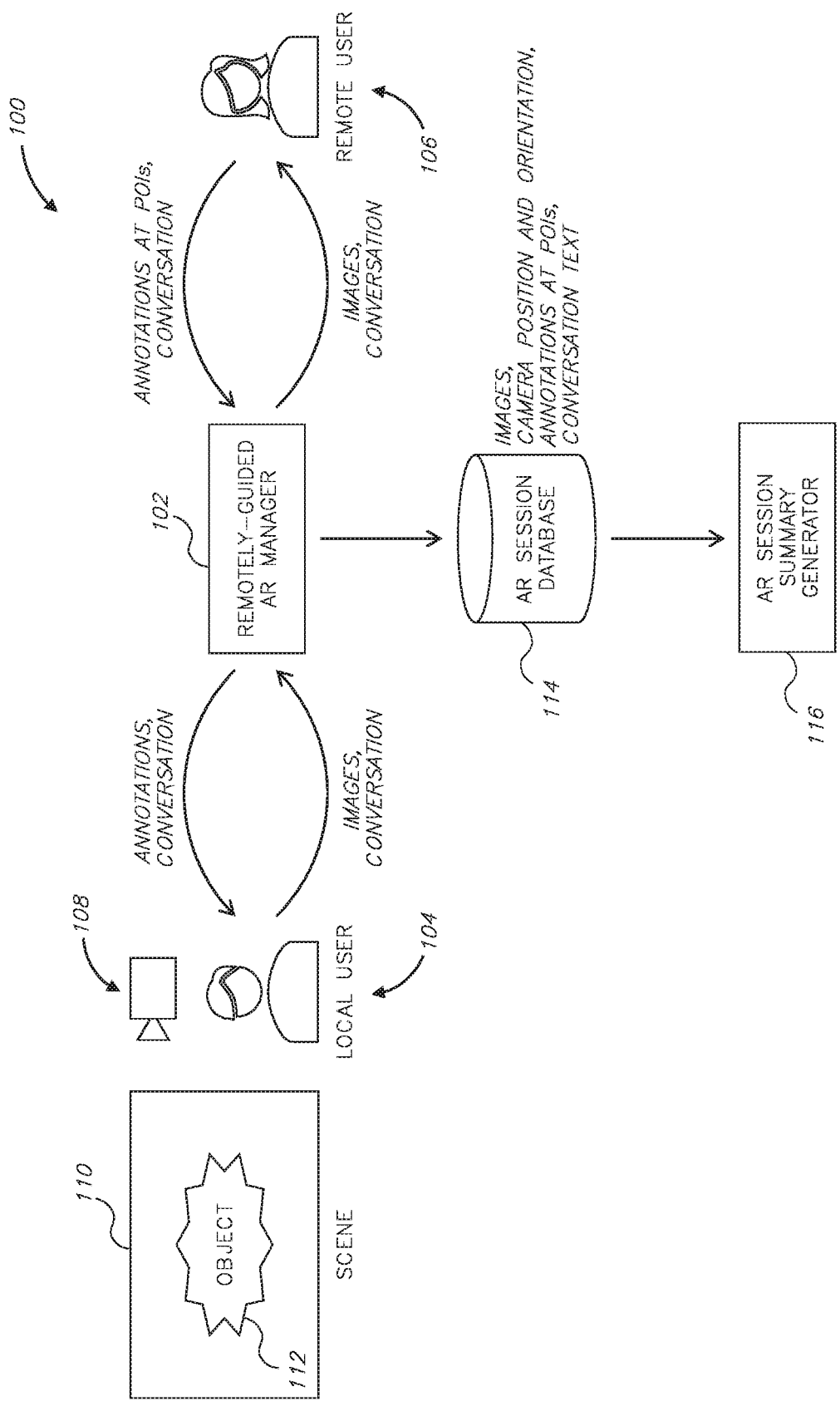
FIG. 1 is a simplified conceptual illustration of a system for automatic summarization of a remotely-guided augmented reality session, in accordance with some embodiments of the invention.

Reference is now made to FIG. 1, which is a simplified conceptual illustration of a remotely-guided AR system 100.

In system 100, AR session data are obtained, processed, and/or transmitted by a remotely-guided AR manager 102 during a remotely-guided AR session. AR manager 102 denotes one or more computing devices that manage the remotely-guided AR session between a local user 104 and a remote user 106. For example, AR manager 102 may be a computing device located in the immediate vicinity of local user 104, and communicates over a network with a personal computing device (not shown) of remote user 106. As another example, AR manager 102 may be a computing device located in the immediate vicinity of remote user 106, and communicates over a network with a personal computing device (not shown) of local user 104. As a further example. AR manager 102 may be a server-type computing device situated away from users 104 and 106, and accessible to them, via their personal computing devices, over a network. The network may be, for example, a LAN (Local Area Network), a WLAN (wireless LAN), or a WAN (Wide Area Network) such as the Internet.

AR manager 102, or the personal computing device of local user 104, may include or be functionally associated with a camera 108 that captures still images or videos of a scene 110 which includes at least one object 112. For simplicity of discussion, the output of camera 108 is described herein as "images," and these may be either still images or frames extracted from a video captured by the camera.

Scene 110 may include any indoors or outdoors area at which a procedure is performed by local user 104 with respect to object 112. By way of example, scene 110 may be an area in a factory in which a certain machine (the object) undergoes maintenance by local user 104, or an engine compartment of a motor vehicle in which a certain automotive part (the object) is being serviced.

The images captured by camera 108 may be transmitted to remote user 106 for viewing. The images may also be displayed to local user 104, for example on a screen of a portable computing device, a wearable display, or the like.

AR manager 102, or the personal computing device of local user 104, may further obtain or calculate per-image camera position and orientation data, where each camera position and orientation datum is defined relative to a set of three-dimensional (3D) axes of scene 110, in accordance with conventional techniques.

AR manager 102, or the personal computing device of remote user 106, may further manage generation and transmission of annotations, such as text and/or graphic annotations, which the remote user creates and associates with various points-of-interest (POIs) in the images he or she views. For example, during the remotely-guided AR session, remote user 106 may use one or more input devices (e.g., keyboard, pointing device, touch screen, etc.) to superimpose annotations over different images of scene 110. For instance, if remote user 106 wants to instruct local user 104 to remove a certain screw from object 112, then the remote user may generate a suitable textual annotation at the location of the screw in one of the images. That annotation will then be displayed to local user 104, for example in an augmented layer persisting over the real-time video of scene 110 watched by the local user. AR manager 102, or the personal computing device of remote user 106, may define the POIs in a 3D representation of scene 110, according to the set of 3D axes of the scene. The 3D representation may be generated using conventional techniques, based on the camera position and orientation data, for example.

AR manager 102, or the different computing device associated with it, may further manage transmission of a conversation between local user 104 and remote user 106, such as in the form of a textual chat between these parties, a voice conversation between them, and/or step-by-step guidance text provided by the remote user to the local user, all during the remotely-guided AR session. Optionally, the voice conversation may be automatically transcribed, to provide a text version of that conversation.

AR manager 102 may record in an AR session database 114 all or some of the data obtained, transmitted, generated, and/or calculated during or with respect to the remotely-guided AR session, such as the images, the camera position and orientation data, the annotations and their corresponding POIs, and the conversation text. For simplicity of discussion, these are jointly referred to herein as a "recording" of the remotely-guided AR session.

That recording, stored in AR session database 114, may then be received and processed by an AR session summary generator 116, to automatically generate a summary of the remotely-guided AR session.

Figure 2:
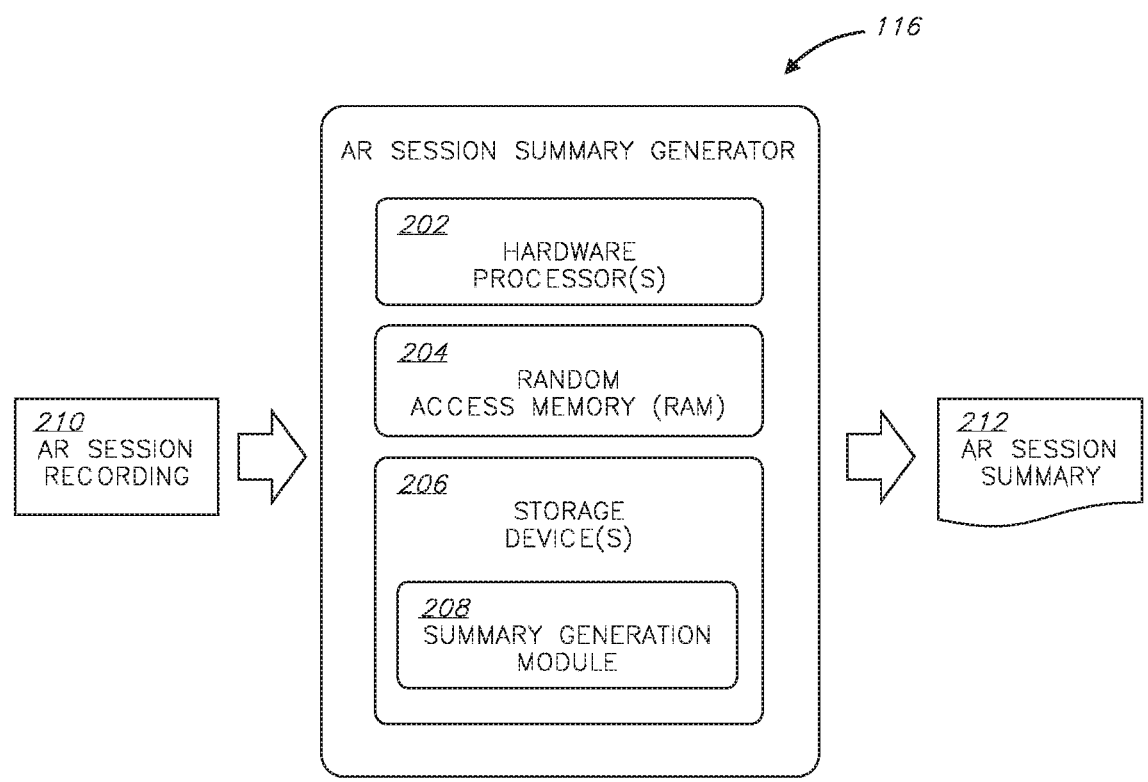
FIG. 2 is a block diagram of a computing device for generating a summary of a remotely-guided augmented reality session, in accordance with some embodiments of the invention.

Reference is now made to FIG. 2, which shows a block diagram of the components of summary generator 116. Summary generator 116 may be a computing device, including one or more hardware processor(s) 202, a random-access memory (RAM) 204, and one or more non-transitory computer-readable storage device(s) 206.

Storage device(s) 206 may have stored thereon program instructions and/or components configured to operate hardware processor(s) 202. The program instructions may include one or more software modules, such as a summary generation module 208. The software components may include an operating system having various software components and/or drivers for controlling and managing general system tasks (e.g., memory management, storage device control, power management, etc.), and facilitating communication between various hardware and software components.

Summary generator 116 may operate by loading instructions of summary generation module 208 into RAM 204 as they are being executed by processor(s) 202. The instructions of summary generation module 208 may cause summary generator 116 to receive a recording 210 of a remotely-guided AR session, process it, and output a summary 212 of that session.

Summary generator 116 as described herein is only an exemplary embodiment of the present invention, and in practice may be implemented in hardware only, software only, or a combination of both hardware and software. Summary generator 116 may have more or fewer components and modules than shown, may combine two or more of the components, or may have a different configuration or arrangement of the components. Summary generator 116 may include any additional component enabling it to function as an operable computer system, such as a motherboard, data busses, power supply, a network interface card, a display, an input device (e.g., keyboard, pointing device, touch-sensitive display), etc. (not shown). Components of summary generator 116 may be co-located or distributed (e.g., in a distributed computing architecture). Moreover, in an alternative embodiment, summary generator 116, AR manager 102, and optionally also AR session database 114 (of FIG. 1) may be realized as a single computing device which carries out the functionalities of all three.

The instructions of summary generation module 108 are now discussed with reference to the flowchart of FIG. 3, which illustrates a method 300 for automatically generating a summary of a remotely-guided AR session, in accordance with an embodiment.

Steps of method 300 may either be performed in the order they are presented or in a different order (or even in parallel), as long as the order allows for a necessary input to a certain step to be obtained from an output of an earlier step. In addition, the steps of method 300 are performed automatically (e.g., by summary generator 116 of FIG. 2), unless specifically stated otherwise.

In a step 302, the recording of the remotely-guided AR session is received. That recording, as mentioned above, may include the images captured by the camera of the local user, the camera location and orientation data, the annotations generated by the remote user at the various POIs, and the conversation text.

In a step 304, prominent images are selected out of the images (denoted G, and also referred to as the "candidate images") captured by the camera. The total number of captured images may be too high to include in the summary of the remotely-guided AR session, with many of these images being redundant (as they depict similar views of the scene) or irrelevant. The goal of the image selection is, therefore, to be able to include in the summary only the least amount of images necessary for comprehending the procedure carried out by the local user during the remotely-guided AR session. The image selection of step 304 may include the following sub-steps:

In a sub-step 304a, those candidate images in G, on which the annotations and POIs were indicated during the remotely-guided augmented reality session, are added to a new, empty set S. For example, if G includes 10,000 images, and the annotations and POIs were indicated only on 15 images out of G, then these 15 images will be added to S.

In a sub-step 304b, a difference in a pairwise "viewed region distance" is determined between each image in S and each image in G; any image in G whose viewed region distance is not sufficiently different than an image in S—is removed from G. This viewed region distance represents an aggregate of two-dimensional distances between projected positions of the point of a sparse point cloud in every evaluated pair of images (one from S and the other from G). This may be illustrated as follows. During the remotely-guided AR session, a 3D representation of the scene is constructed in accordance with conventional techniques, where the 3D representation is provided as a sparse point cloud having n points as $\{P_k | k \in [1, 2, \ldots n]\}$. For any two-dimensional image $I_i$ and each three-dimensional scene point $P_k$, let $\pi_{i,k}$ represent the projection of $P_k$ to $I_i$ based on the camera position and orientation associated with $I_i$. For any pair of images $I_i$ and $I_j$, one from G and the other from $$S, \text{let } D_{i,j} = \sum_k \|\pi_{i,k} - \pi_{j,k}\|_2^2$$

represent the viewed region distance between $I_i$ and $I_j$ as the aggregate of the two-dimensional distances between the projected positions of the points of the sparse point cloud in the two images. For a given image $I_i$, an image $I_j$ is considered to be similar to $I_i$ if $D_{i,j} < T$ for a predefined threshold T. Thus, once the viewed region distance is determined for a given image in S when compared with a given candidate image in G, the given candidate image is removed from G if the viewed region distance is below the predefined threshold value. G then contains only those images whose viewed region distance is sufficiently different than any image in S.

In a sub-step 304c, additional images from G are added to S, using a non-maximal suppression algorithm, as follows: First, a "focus score" is determined for each candidate image in G, representing the extent to which the object is in the center of each image. This may be illustrated as follows. Using the 3D representation of the scene as described above in sub-step 304b:

For each 3D point $P_k$
For each image $I_i$
Let $\pi_{i,k}$ represent the projection of $P_k$ to $I_i$
If $\pi_{i,k}$ is outside the boundaries of $I_i$
  $F_{i,k} = 0$
else
  Let $d_{i,k} = \|\pi_{i,k} - C_i\|_2^2$ represent the distance of the projected point from the image center $C_i$ $$\text{Let } F_{i,k} = \frac{1}{a + d_{i,k}^2}$$

represent the point focus score of the point $P_k$ in $I_i$.
Consequently, $$F_k = \sum_i F_{i,k}$$

represents the overall point focus score of each point $P_k$ across the entire G, and $$F_i = \Sigma_k F_{i,k}$$

represents the aggregate of such overall point focus scores for each image $I_i$ in G.

Second, the candidate images in G are sorted in descending order according to their determined focus scores. Then, the following process is iterated, until G becomes empty: (a) The first image in the sorted G (namely, the one with the highest focus score) is added to S; (b) The viewed region distance between that first image and each of the other candidate images in G is evaluated; (c) If the evaluated distance is below a predefined threshold value T for any of the other candidate images, that image is removed from G. Note that this threshold may have the same value or a different value than the threshold used in sub-step 304b. Each iteration, namely, adds to S the candidate image having the highest focus score out of the candidate images remaining in G, and removes from G those candidate images which are too similar to that highest-ranking image—so that they cannot be added to S in subsequent iterations. G becomes empty once all dissimilar images, having the highest focus scores, have been moved to S.

As step 304 concludes, the resulting set S contains the most prominent images captured during the remotely-guided AR session.

In a step 306, the annotations made during the remotely-guided AR session may be projected to matching locations in the prominent images, based on the POIs of these annotations and on the position and orientation data of the camera. Each annotation, whose POI is defined in 3D (in the 3D representation of the scene), is projected to 2D, to a matching location in one of the prominent images on which that annotation was originally indicated. For example, if the annotation "Remove this screw" is defined at the 3D POI (150, 200, 305), it will become projected to a matching 2D location, such as (180, 40) in the respective prominent image, where the screw is depicted. Note that, since an annotation typically has to occupy a 2D space (such as a text or a graphic requiring its display in at least 2D) on the prominent image, but the matching location is just a point in 2D, there are a number of options where to position the annotation when projecting it: One option is to position a relatively small marker (such as a dot, circle, or the like) at the POI, and place the annotation next to it, with or without a connecting line therebetween—such that a viewer understands what position in the prominent image the annotation refers to. Another option, which may be suitable for relatively small annotations (e.g., very short texts, or simple graphics such as an arrow or a circle), is simply to position them at the POI. Those of skill in the art will recognize other ways to position annotations, with or without added markers, in the prominent images.

In a step 308, the conversation text may be temporally aligned with the projected annotations. The alignment may be performed based on time stamps associated with the conversation text (indicating when each portion of the text, such as a word, a sentence, or a few sentences, was transmitted or uttered by the remote or local user) and time stamps associated with the projected annotations (indicating when each annotation was originally displayed to the local user).

For example, portions of the text conversation may become associated (aligned) with the annotation which is temporally closest to them. As another example, each projected annotation may become associated (aligned) with a portion of the conversation text which took place during a certain predefined time window before and/or after the time stamp of that annotation. For instance, if a certain projected annotation has the time stamp "2020-02-01 T 10:45:00," and the predefined time window is 10 seconds prior to the annotation to 30 seconds following the annotation, then all portions of the conversation text with a time stamp between "2020-02-01 T 10:44:50" and "2020-02-01 T 10:45:30" may become associated (aligned) with that projected annotation.

Finally, a summary 310 of the remotely-guided AR session is generated, based on the actions performed in steps 302 through 308. Summary 310 may be an electronic document in any suitable format, such as PDF (Portable Document Format), which can contain at least graphics and text. Included in the summary are: First, the prominent images—both those having annotations projected onto them, and those without projected annotations. Second, a dissemination of the conversation text amongst those prominent images having the projected annotations, according to the temporal alignment; every prominent image with a projected annotation may have, next to it, a portion of the conversation text that is associated with that prominent image—as determined by the temporal alignment process.

Figure 3:
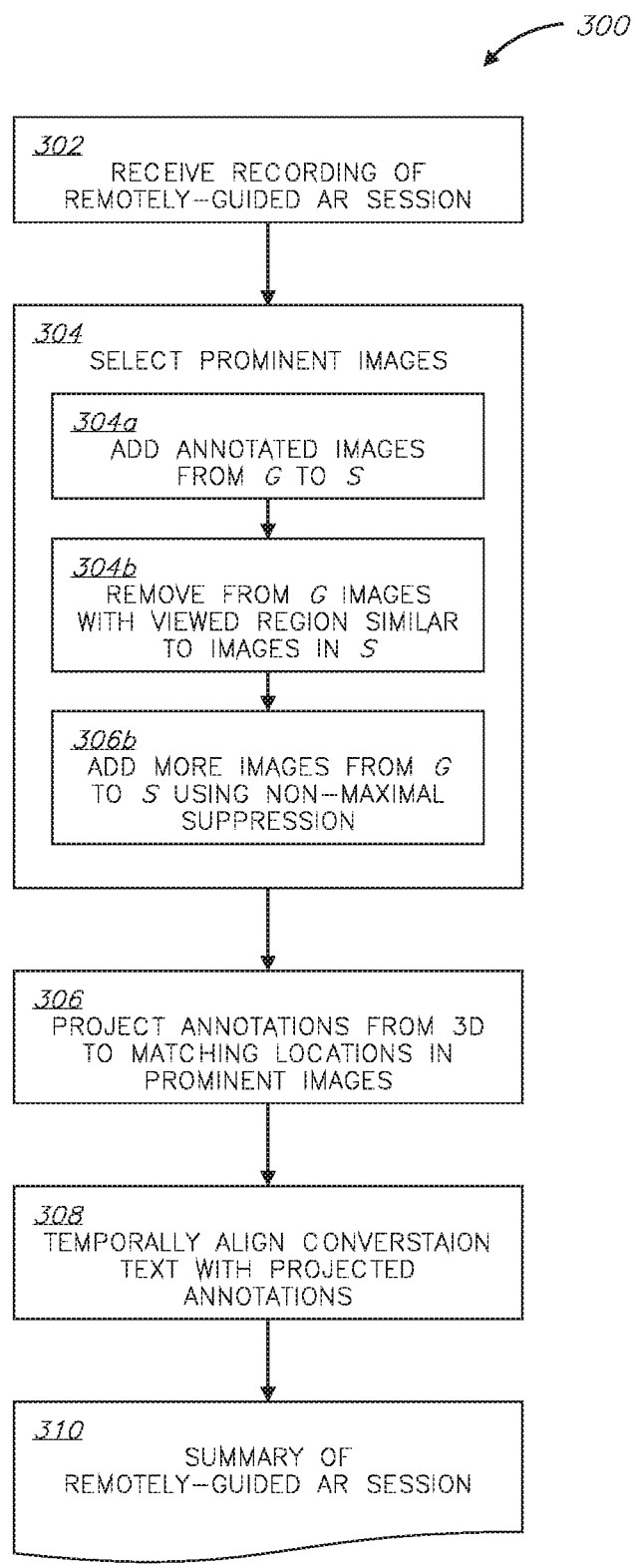
FIG. 3 is a simplified flowchart illustration of an exemplary method for generating a summary of a remotely-guided augmented reality session, in accordance with some embodiments of the invention.
Figure 4:
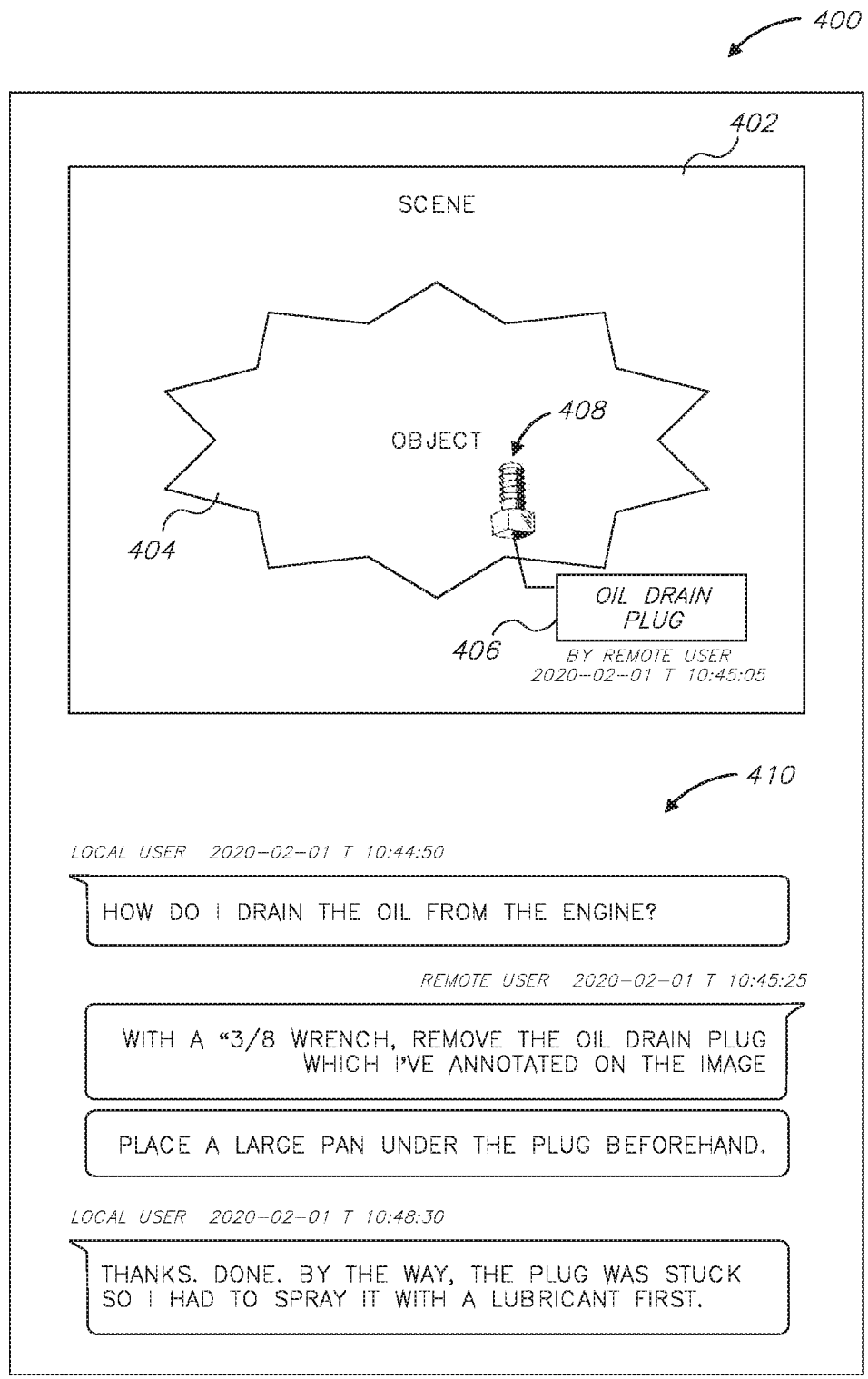
FIG. 4 is a semi-pictorial illustration of a section of an exemplary summary of a remotely-guided augmented reality session, in accordance with some embodiments of the invention.

Reference is now made to FIG. 4, which is a semi-pictorial illustration of a section 400 of an exemplary summary, generated according to the method of FIG. 3. Section 400 includes, at its top, a prominent image 402 of a scene, in which an object 404 is shown substantially centered. An annotation "OIL DRAIN PLUG" 406 is shown next to where that plug is depicted 408 in prominent image 402. Annotation 406 was projected from 3D to the 2D prominent image 402. Below, relevant portions of a text conversation between a remote user and a local user are displayed 410. These portions, whose time stamps are relatively close to the time stamp of annotation 406, can be used by any person who desires to learn how to drain the oil from the type of engine depicted in prominent image 402.

FIG. 4 is, of course, just an exemplary layout of a section of a remotely-guided AR session summary. Those of skill in the art will recognize other possible layouts of the information included in the summary—the prominent images (those having projected annotations and those not), and the dissemination of the conversation text amongst those prominent images having the projected annotations. The summary may extend over multiple pages of the electronic document. Additionally or alternatively, the summary may include a mechanism to navigate inside the electronic document non-linearly, such as by providing a table of contents of the remotely-guided AR session with links to the various prominent images, annotations, and or conversation texts of that session. Furthermore, the summary may include links to external content, such as to voice recordings of the conversation, to video files recorded during the session, etc.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising operating at least one hardware processor to:
    receive a recording of a remotely-guided augmented reality (AR) session, the recording comprising:
        images of a scene, captured by a camera of a local user,
        position and orientation data of the camera,
        annotations generated by a remote user at points-of-interest (POIs) in a three-dimensional (3D) representation of the scene; and
    automatically generate an electronic document which comprises a summary of the remotely-guided AR session, by:
        selecting prominent images out of the images of the scene, by:
            (a) defining the images of the scene as a set of candidate images (G),
            (b) adding, to an empty set (S), those of the images of G on which the annotations were indicated during the remotely-guided AR session,
            (c) removing from G images whose pairwise viewed region distance from any image in S is below a predefined threshold, and
            (d) adding to S additional images from G, using a non-maximal suppression algorithm in which images of G are sorted according to a focus score (F) and are rejected according to viewed region distance,
        such that S includes the prominent images,
        projecting the annotations to matching locations in some of the prominent images, based on the POIs of the annotations and on the position and orientation data of the camera, and
        including, in the summary: the prominent images, including those of the prominent images having the projected annotations.

2. The method of claim 1, wherein the pairwise viewed region distance is determined, for any pair of images $I_i$ and $I_j$, by:
    defining the 3D representation of the scene as a sparse point cloud $\{P_k | k \in [1, 2, \ldots n]\}$ having n points;
    defining $\pi_{i,k}$ as a projection of $P_k$ to $I_i$, based on the position and orientation data of the camera associated with $I_i$; and
    defining the pairwise viewed region distance between $I_i$ and $I_j$ as $D_{i,j} = \Sigma_k \|\pi_{i,k} - \pi_{j,k}\|_2^2$.

wherein i, j, a, k, and n are integers.

3. The method of claim 2, wherein the non-maximal suppression algorithm comprises:
defining the focus score F of each image in G as an aggregate of overall point focus scores of all points $P_k$ whose projections are within the respective image:

$$F_i = \Sigma_k F_{i,k},$$

wherein each of the point focus scores is determined by:
for each point $P_k$, and for each image $I_i$ in G:
(a) if $\pi_{i,k}$ is outside boundaries of $I_i$, the point focus score for point $P_k$ is set to zero,
(b) if $\pi_{i,k}$ is inside boundaries of $I_i$:
(i) defining $d_{i,k} = \|\pi_{i,k} - C_i\|_2^2$ as a distance of point $P_k$ from a center ($C_i$) of $I_i$,
(ii) defining $$F_{i,k} = \frac{1}{a + d_{i,k}^2}$$

as a point focus score of point $P_k$ in $I_i$, and
(iii) defining $$F_k = \Sigma_i F_{i,k}$$

as the overall point focus score of point $P_k$ across all of G.

4. The method of claim 3, wherein the non-maximal suppression algorithm further comprises:
sorting the images in G in descending order according to their focus scores; and
iteratively, until G is empty:
(a) adding the first image in G to S, and
(b) removing from G any other image of G whose viewed region distance from the first image is below a predefined threshold,
such that, when G is empty, S includes the prominent images.

5. The method of claim 1, wherein:
the recording of the remotely-guided AR session further comprises conversation text between the local user and the remote user;
the automatic generation of the electronic document further comprises temporally aligning the conversation text with the projected annotations; and
the inclusion in the summary is also of a dissemination of the conversation text amongst those of the prominent images having the projected annotations, wherein the dissemination is according to the temporal alignment.

6. A system comprising:
(i) at least one hardware processor; and
(ii) a non-transitory computer-readable storage medium having program code embodied therewith, the program code executable by said at least one hardware processor to:
receive a recording of a remotely-guided augmented reality (AR) session, the recording comprising:
images of a scene, captured by a camera of a local user,
position and orientation data of the camera,
annotations generated by a remote user at points-of-interest (POIs) in a three-dimensional (3D) representation of the scene; and
automatically generate an electronic document which comprises a summary of the remotely-guided AR session, by:
selecting prominent images out of the images of the scene, by:
(a) defining the images of the scene as a set of candidate images (G),
(b) adding, to an empty set (S), those of the images of G on which the annotations were indicated during the remotely-guided AR session,
(c) removing from G images whose pairwise viewed region distance from any image in S is below a predefined threshold, and
(d) adding to S additional images from G, using a non-maximal suppression algorithm in which images of G are sorted according to a focus score (F) and are rejected according to viewed region distance,
such that S includes the prominent images,
projecting the annotations to matching locations in some of the prominent images, based on the POIs of the annotations and on the position and orientation data of the camera, and
including, in the summary: the prominent images, including those of the prominent images having the projected annotations.

7. The system of claim 6, wherein the pairwise viewed region distance is determined, for any pair of images $I_i$ and $I_j$, by:
defining the 3D representation of the scene as a sparse point cloud $\{P_k | k \in [1, 2, \ldots n]\}$ having n points;
defining $\pi_{i,k}$ as a projection of $P_k$ to $I_i$, based on the position and orientation data of the camera associated with $I_i$; and
defining the pairwise viewed region distance between $I_i$ and $I_j$ as $$D_{i,j} = \Sigma_k \|\pi_{i,k} - \pi_{j,k}\|_2^2.$$

wherein i, j, a, k, and n are integers.

8. The system of claim 7, wherein the non-maximal suppression algorithm comprises:
defining the focus score F of each image in G as an aggregate of overall point focus scores of all points $P_k$ whose projections are within the respective image:

$$F_i = \Sigma_k F_{i,k},$$

wherein each of the point focus scores is determined by:
for each point $P_k$, and for each image $I_i$ in G:
(a) if $\pi_{i,k}$ is outside boundaries of $I_i$, the point focus score for point $P_k$ is set to zero,
(b) if $\pi_{i,k}$ is inside boundaries of $I_i$:
(i) defining $d_{i,k} = \|\pi_{i,k} - C_i\|_2^2$ as a distance of point $P_k$ from a center ($C_i$) of $I_i$, (ii) defining $$F_{i,k} = \frac{1}{a + d_{i,k}^2}$$

as a point focus score of point $P_k$ in $I_i$, and
(iii) defining $$F_k = \Sigma_i F_{i,k}$$

as the overall point focus score of point $P_k$ across all of G.

9. The system of claim 8, wherein the non-maximal suppression algorithm further comprises:
sorting the images in G in descending order according to their focus scores; and
iteratively, until G is empty:
(a) adding the first image in G to S, and
(b) removing from G any other image of G whose viewed region distance from the first image is below a predefined threshold,
such that, when G is empty, S includes the prominent images.

10. The system of claim 6, wherein:
the recording of the remotely-guided AR session further comprises conversation text between the local user and the remote user;
the automatic generation of the electronic document further comprises temporally aligning the conversation text with the projected annotations; and
the inclusion in the summary is also of a dissemination of the conversation text amongst those of the prominent images having the projected annotations, wherein the dissemination is according to the temporal alignment.

11. A computer program product comprising a non-transitory computer-readable storage medium having program code embodied therewith, the program code executable by at least one hardware processor to:
receive a recording of a remotely-guided augmented reality (AR) session, the recording comprising:
images of a scene, captured by a camera of a local user,
position and orientation data of the camera,
annotations generated by a remote user at points-of-interest (POIs) in a three-dimensional (3D) representation of the scene; and
automatically generate an electronic document which comprises a summary of the remotely-guided AR session, by:
selecting prominent images out of the images of the scene, by:
(a) defining the images of the scene as a set of candidate images (G),
(b) adding, to an empty set (S), those of the images of G on which the annotations were indicated during the remotely-guided AR session,
(c) removing from G images whose pairwise viewed region distance from any image in S is below a predefined threshold, and
(d) adding to S additional images from G, using a non-maximal suppression algorithm in which images of G are sorted according to a focus score (F) and are rejected according to viewed region distance,
such that S includes the prominent images,
projecting the annotations to matching locations in some of the prominent images, based on the POIs of the annotations and on the position and orientation data of the camera, and
including, in the summary: the prominent images, including those of the prominent images having the projected annotations.

12. The computer program product of claim 11, wherein the pairwise viewed region distance is determined, for any pair of images $I_i$ and $I_j$, by:
defining the 3D representation of the scene as a sparse point cloud $\{P_k | k \in [1, 2, \ldots n]\}$ having n points;
defining $\pi_{i,k}$ as a projection of $P_k$ to $I_i$, based on the position and orientation data of the camera associated with $I_i$; and
defining the pairwise viewed region distance between $I_i$ and $I_j$ as $$D_{i,j} = \Sigma_k \|\pi_{i,k} - \pi_{j,k}\|_2^2,$$

wherein i, j, a, k, and n are integers.

13. The computer program product of claim 12, wherein the non-maximal suppression algorithm comprises:
defining the focus score F of each image in G as an aggregate of overall point focus scores of all points $P_k$ whose projections are within the respective image:

$$F_i = \Sigma_k F_{i,k},$$

wherein each of the point focus scores is determined by:
for each point $P_k$, and for each image $I_i$ in G:
(a) if $\pi_{i,k}$ is outside boundaries of $I_i$, the point focus score for point $P_k$ is set to zero,
(b) if $I_{i,k}$ is inside boundaries of $I_i$:
(i) defining $d_{i,k} = \|\pi_{i,k} - C_i\|_2^2$ as a distance of point $P_k$ from a center ($C_i$) of $I_i$,
(ii) defining $$F_{i,k} = \frac{1}{a + d_{i,k}^2}$$

as a point focus score of point $P_k$ in $I_i$, and
(iii) defining $$F_k = \Sigma_i F_{i,k}$$

as the overall point focus score of point $P_k$ across all of G.

14. The computer program product of claim 13, wherein the non-maximal suppression algorithm further comprises:
sorting the images in G in descending order according to their focus scores; and
iteratively, until G is empty:
(a) adding the first image in G to S, and
(b) removing from G any other image of G whose viewed region distance from the first image is below a predefined threshold, such that, when G is empty, S includes the prominent images.

15. The computer program product of claim 11, wherein:
the recording of the remotely-guided AR session further comprises conversation text between the local user and the remote user;
the automatic generation of the electronic document further comprises temporally aligning the conversation text with the projected annotations; and
the inclusion in the summary is also of a dissemination of the conversation text amongst those of the prominent images having the projected annotations, wherein the dissemination is according to the temporal alignment.

* * * * *